May 29, 1962     I. CIMERMAN ETAL     3,037,151
VOLTAGE MONITORING APPARATUS
Filed Jan. 2, 1959
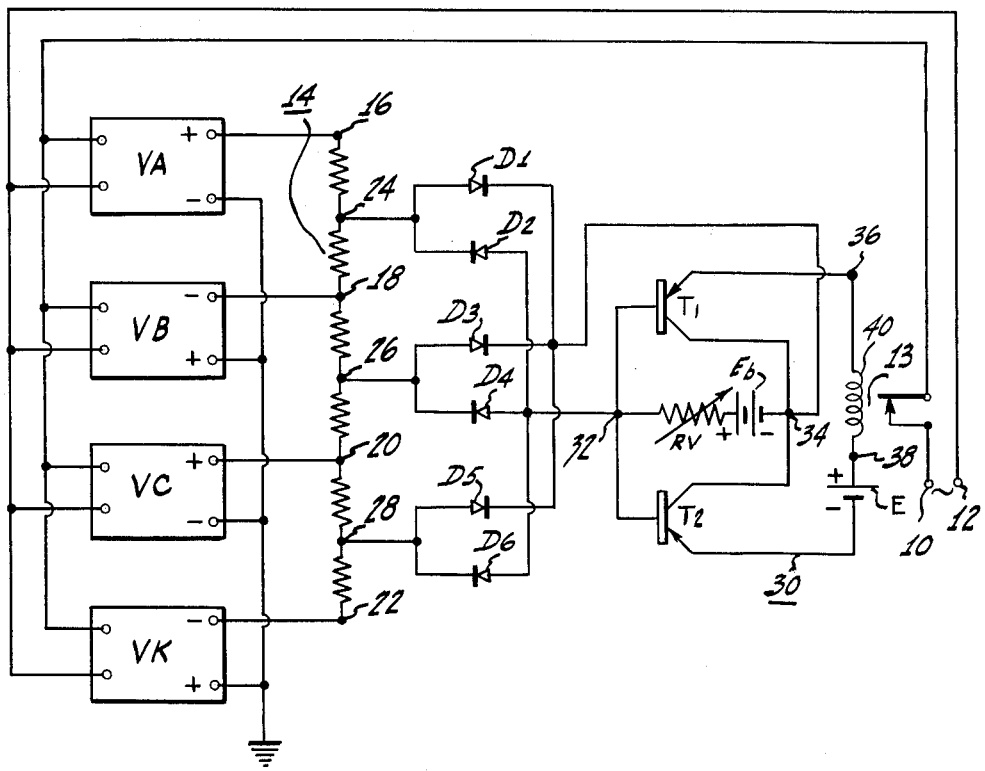
INVENTORS
ISAAC CIMERMAN,
VINCENT A. MINA &
WALDEMAR SAEGER
BY
ATTORNEY United States Patent Office 3,037,151
Patented May 29, 1962

3,037,151
VOLTAGE MONITORING APPARATUS
Isaac Cimerman, Haddonfield, and Waldemar Saeger, Pennsauken, N.J., and Vincent A. Mina, Philadelphia, Pa., assignors to Radio Corporation of America, a corporation of Delaware
Filed Jan. 2, 1959, Ser. No. 784,696
9 Claims. (Cl. 317—27)

This invention relates generally to apparatus for protecting power supplies and loads thereon from improper voltages, and more particularly to apparatus for monitoring the output voltages of a plurality of power supplies and means for causing an event to occur when the output voltages vary from each other by more than a predetermined amount.

The voltage monitoring apparatus of the present invention is particularly useful in complex electronic computers for insuring a proper output voltage from each of a plurality of power supplies.

In complex electronic equipment requiring a plurality of power supplies, and especially in apparatus employing a plurality of semiconductors, it is highly desirable to maintain the output voltages from these power supplies substantially constant in order to prevent possible damage to certain components. It is also very important that the amplitude of the output voltages from these power supplies be maintained at a predetermined ratio with respect to each other. In the event that this predetermined ratio of output voltages is not maintained within acceptable limits, it is desirable to have means to sense variations from this predetermined ratio and to protect any components that may be affected. It is also desirable that the sensing circuit be a floating circuit, that is, not tied to a common connection of any of the power supplies that are monitored.

Accordingly, it is an object of the present invention to provide apparatus to monitor the output voltages of a plurality of power supplies and to actuate a protective circuit when the ratio of the output voltages from the power supplies varies from a predetermined value.

Another object of the present invention is to provide improved apparatus to montior the output voltages of a plurality of power supplies, including means to shut off these power supplies when their output voltages vary from predetermined values.

Still another object of the present invention is to provide improved apparatus for monitoring the output voltages of a plurality of power supplies, each of which has an output terminal connected to a common connection, and to provide floating circuit means independent of the common connection for detecting variations in ratio of the amplitudes of the output voltages.

A further object of the present invention is to provide improved apparatus of the type described that is relatively simple in operation and construction, and that is relatively economical and efficient in use.

By a positive voltage output, as used in this specification, including the appended claims, is meant the output voltage from a unidirectional power supply whose negative output terminal is connected to a common connection, such as ground. Conversely, a negative output voltage, as used in this specification, including the appended claims, is meant the output voltage derived from a unidirectional power supply whose positive output terminal is connected to the common connection, such as ground.

In accordance with the present invention, the foregoing objects and related advantages are attained in improved apparatus for monitoring the output voltages, both positive and negative, of a plurality of power supplies and for providing an indication when the output voltages vary from a predetermined relationship to each other. One of the output terminals of each of the power supplies being monitored is connected to a common terminal, in accordance with a desired output voltage, positive or negative. Successive taps along a voltage divider are connected to the other output terminals of the power supplies, respectively, in a manner whereby a series of points, each between a pair of adjacent ones of said successive taps, are substantially of the same potential under normal conditions of operation. Each of these equipotential points on the voltage divider is connected to the input terminals of a relay circuit, through diodes, in a manner whereby current will flow through the relay circuit in only one direction when any of the output voltages varies with respect to another output voltage. The relay circuit comprises a pair of transistors having their base electrodes connected to each other and their collector electrodes connected to each other. An actuating coil of a normally closed relay switch is a load between the output terminals of the relay circuit, and serves to open the switch when the ratio of output voltages varies from a predetermined value. The relay switch is in series with the input terminals to the power supplies, and thereby serves to remove unwanted voltages when it is actuated. A biasing circuit is connected between the input terminals of the relay circuit to adjust the sensitivity of the relay circuit. The relay circuit is floating in that it does not share a common connection with the power supplies.

The novel features of the present invention, as well as the invention itself, both as to its organization and method of operation, will be understood in detail when considered in connection with the accompanying drawing in which there is shown a circuit diagram of the improved apparatus for monitoring the output voltages, both negative and positive, of a plurality of power supplies, in accordance with the present invention.

Referring now to the drawing, there are shown a plurality of unidirectional power supplies VA, VB, VC, and VK, whose output voltages are to be monitored in accordance with the monitoring apparatus of the present invention. The power supplies VA and VC provide positive output voltages in that their negative output terminals are connected to a common connection, such as ground. The power supplies VB and VK provide negative output voltages in that their positive output terminals are connected to the common connection. Each of the power supplies VA, VB, VC, and VK, has a pair of input terminals connected to a suitable source of A.-C. voltage, represented herein by the terminals 10 and 12, through a pair of normally closed contacts of a relay switch 13. It will now be understood that, under normal operating conditions, with the points of the relay switch 13 closed, each of the power supplies VA, VB, VC, and VK will provide an output voltage of a predetermined amplitude and polarity with respect to the common connection. The power supply VK may be a source of standard voltage, such as that from a very well regulated power supply, for the purpose hereinafter appearing.

In order to monitor the output voltages from the power supplies VA, VB, VC, and VK, the output terminals of these power supplies that are not connected to the common terminal are connected to successive taps along a voltage divider 14. Thus, the positive output terminal of the power supply VA is connected to a tap 16 on the voltage divider 14. The negative output terminal of the power supply VB is connected to a tap 18 on the voltage divider 14. The positive output terminal of the power supply VC is connected to a tap 20 of the voltage divider 14; and the negative output terminal of the power supply VK is connected to a tap 22 of the voltage divider 14. It will now be understood that the taps 16, 18, 20, and 22 are successive taps along the voltage divider 14, and that these successive taps vary in potential from a positive potential to a negative potential with respect to the common connection, ground.

With the power supplies VA, VB, VC, and VK operating normally, it will be observed that there are points between the taps 16, 18, 20, and 22 on the voltage divider 14 that may be of the same potential with respect to each other. Thus, a point 24 between the taps 16 and 18, a point 26 between the taps 18 and 20, and a point 28 between the taps 20 and 22 may be at the same potential, say zero volts, for example, with respect to the common connection.

Means are provided, in the form of a relay circuit 30, to sense when the output voltages from the power supplies VA, VB, VC, and VK differ from each other by more than a predetermined amount. The relay circuit is provided with a pair of input terminals 32 and 34 and a pair of output terminals 36 and 38. The relay circuit 30 comprises a pair of pnp transistors T1 and T2. The base electrodes of the transistors T1 and T2 are connected to each other through the input terminal 32; and the collectors of the transistors T1 and T2 are connected to each other through the input terminal 34. The emitter of the transistor T1 is connected to the output terminal 36; and the emitter of the transistor T2 is connected to the output terminal 38 through a source of operating voltage E. An actuating coil 40 of the relay switch 13 is connected between the output terminals 36 and 38 as a load on the relay circuit 30.

Bias means are connected between the input terminals 32 and 34 of the relay circuit 30 to prevent the circuit 30 from conducting in the absence of a difference in potential between the input terminals 32 and 34. Thus, a source of bias voltage $E_b$ is connected in series with a variable resistor RV and the negative terminal 34. The resistor RV is connected between the input terminal 32 and the positive terminal of the source of voltage $E_b$. It will now be understood that the resistance of the resistor RV may be varied until the voltage applied to the base electrodes of the transistors T1 and T2 is just sufficient to prevent conduction through the transistors T1 and T2 and through the load between the output terminals 36 and 38.

Means are provided to connect the equipotential points 24, 26, and 28, on the voltage divider 14 to the input terminals 32 and 34 of the relay circuit 30. To this end, a pair of diodes is associated with each equipotential point in a manner to cause current to flow through the relay circuit 30 when the voltage of one equipotential point tends to vary from the voltage of an adjacent equipotential point. Thus, the point 24 on the voltage divider 14 is connected to the anode of a diode D1 and to the cathode of a diode D2; the point 26 is connected to the anode of a diode D3 and to the cathode of a diode D4; and the point 28 is connected to the anode of a diode D5 and to the cathode of a diode D6. The cathodes of the diodes D1, D3, and D5 are connected to each other and to the input terminal 34 of the relay circuit 30. The anodes of the diodes D2, D4, and D6 are also connected to each other and to the input terminal 32 of the relay circuit 30. It will now be understood that when the potential of any of the equipotential points 24, 26, or 28 tends to differ from any other, as when the output voltages from the power supplies differ from predetermined values, current will flow between the input terminals 32 and 34 of the relay circuit 30. In other words, the difference in potential between the terminals 32 and 34 will overcome the bias provided by the source of bias voltage $E_b$ and the resistor RV. When this happens, current will also flow from the positive terminal of the source of voltage E through the actuating coil 40, through the emitter-collector path of the transistor T1, through the collector-emitter path of the transistor T2, and back to the negative terminal of the source of voltage E.

The operation of the voltage monitoring apparatus, in accordance with the present invention, will now be explained: Let it be assumed that the output voltages from the power supplies VA, VB, VC, and VK differ from each other but bear a predetermined ratio to each other. Under these conditions, the points 24, 26, and 28 on the voltage divider 14 will be equipotential points, and, consequently, there will be no difference in potential across the input terminals 32 and 34 of the relay circuit 30. Since the relay circuit 30 is normally biased just below the brink of conduction, substantially no current flows through the actuating coil 40 of the relay 13, and the power supplies VA, VB, VC, and VK are energized. If any of the output voltages from the power supplies VA, VB, VC, or VK should increase or decrease so that the potential at any one of the equipotential points 24, 26, and 28 should change with respect to any other, current will flow between the input terminals 34 and 32 of the relay circuit 30 by overcoming the bias provided by the voltage $E_b$. Current will now flow between the emitters of the transistors T1 and T2, and through the actuating coil 40 of the relay 13. The A.-C. voltage applied to the input terminals of the power supplies is now interrupted by the opening of the relay switch points of the relay 13. Thus, any components (not shown) operated by the power supplies VA, VB, VC, or VK will cease to receive current and thereby be protected from either an overload or from an improper operating voltage.

In the voltage monitoring apparatus described so far, it is desirable, though not absolutely necessary, that one of the power supplies be a source of standard voltage. Thus, the power supply VK may be a source of constant voltage provided, for example, either by a very well regulated power supply, by a standard cell, or by the voltage drop across a zener diode. With such an arrangement, the output voltages of the power supplies VA, VB, and VC are referenced with respect to the output voltage from the power supply VK, and the relay circuit 30 will be made conductive when any one of the output voltages from the power supplies VA, VB, and VC varies more than a predetermined amount from the voltage provided by the power supply VK. The resistor RV in the biasing circuit of the relay circuit 30 is provided for sensitivity adjustment to vary the triggering voltage that will cause current to flow through the relay circuit 30.

From the foregoing description, it will be apparent that there has been provided a novel voltage monitoring apparatus for preventing operating voltages to be applied to apparatus other than in a predetermined ratio with respect to each other. In this manner, complex electronic equipment is protected from overloads and/or improper operating voltages. While there has been shown apparatus in diagrammatic form, various components useful therein, as well as variations in the apparatus itself coming within the spirit of the invention will, no doubt, readily suggest themselves to those skilled in the art. Hence, it is desired that the foregoing shall be considered merely as illustrative and not in a limiting sense.

What is claimed is:

1. Apparatus for monitoring the output voltages of at least three unidirectional power supplies each having a pair of output terminals, said apparatus comprising a voltage divider, means connecting successive taps along said voltage divider to a separate terminal of each of said pairs of output terminals, respectively, and means connecting the other terminal of each of said pairs of output terminals to a common connection so that a series of points each between adjacent ones of said successive taps will be at the same potential when said output voltages are of predetermined amplitudes, a relay circuit having input terminals, means connecting each of said points through a separate pair of diodes to said input terminals of said relay circuit so that current may flow to and from said relay circuit in only one direction, and biasing means connected between said input terminals of said relay circuit to control the sensitivity of said relay circuit and to permit current to flow in said relay circuit when said output voltages vary from a predetermined ratio with respect to each other.

2. Apparatus as defined in claim 1 wherein one of said unidirectional power supplies comprises a source of substantially constant voltage.

3. Apparatus as defined in claim 1 wherein each of said unidirectional power supplies comprises a pair of input terminals, said apparatus including a relay switch having actuating means connected in said relay circuit, and said relay switch being connected in series with at least one of said input terminals of one of said power supplies.

4. Apparatus for monitoring the output voltages of at least three unidirectional power supplies some of which have a positive output voltage and the others of which have a negative output voltage, said apparatus comprising means connecting the negative output terminals of said positive output voltage power supplies and the positive output terminals of said negative output voltage power supplies to a common connection, a plurality of voltage dividers, means connecting separate ones of said voltage dividers between selected pairs of the other output terminals of said power supplies so that there will be separate points, one on each of said voltage dividers, respectively, that will be at the same potential under normal operating conditions of said power supplies, a relay circuit having input terminals, means connecting each of said points to said input terminals so that current may flow in one direction to and from said input terminals when the potential at any one of said points differs from the potential at another of said points.

5. Apparatus for monitoring the output voltages of at least three unidirectional power supplies some of which have a positive output voltage and the others of which have a negative output voltage, said apparatus comprising means connecting the negative output terminals of said positive output voltage power supplies and the positive output terminals of said negative output voltage power supplies to a common connection, a plurality of voltage dividers, means connecting separate ones of said voltage dividers between the other output terminals of said power supplies so that there will be separate points, one on each of said voltage dividers, respectively, that will be of the same potential under normal conditions of operation of said power supplies, a relay circuit having input and output terminals, means connecting each of said separate points to said input terminals so that current may flow in one direction to and from said input terminals when the potential at any one of said points differs from the potential at another of said points, and a relay switch having actuating means connected between said output terminals of said relay circuit.

6. Apparatus as defined in claim 5 wherein each of said power supplies has a pair of input terminals, and wherein means connect said relay switch in series with at least one of said input terminals of at least one of said power supplies.

7. Apparatus comprising at least three separate unidirectional power supplies each having a pair of output terminals, means connecting one of each of said pairs of output terminals to a common connection, a voltage divider, means connecting the other of each of said pairs of output terminals of said power supplies to successive taps along said voltage divider so that a series of separate points, each said separate point being between successive taps, will be at the same voltage when said power supplies provide output voltages of predetermined amplitudes, a relay circuit comprsing a pair of transistors each having a collector, an emitter, and a base, means connecting said bases to each other, means connecting said collectors to each other, means to apply an operatnig potential and a load between said emitters, a pair of unidirectional means associated with each of said separate points, and means connecting said separate points to said bases and to said collectors through said unidirectional means so that current will flow from the emitter of one of said pairs of transistors to the emitter of the other of said pair of transistors when the voltage at one of said separate points differs from the voltage at another of said separate points.

8. Apparatus to monitor each of the output voltages of at least three unidirectional power supplies each having a pair of output terminals, said apparatus comprising a voltage divider, means connecting each of a plurality of successive taps along said voltage divider to a separate one of each of said pairs of output terminals of each of said power supplies, respectively, and means connecting each of the other of said pairs of output terminals of said power supplies to a common connection so that there will be a series of separate points on said voltage divider, each point between adjacent ones of said successive taps, that will be at the same potential when said output voltages have predetermined values, a relay circuit having a pair of input terminals, a pair of diodes for each of said separate points, means connecting each of said separate points to the anode of one diode and to the cathode of the other diode of its associated pair of diodes, means connecting the cathodes of said one diode in each pair of diodes to each other and to one of said input terminals of said relay circuit, means connecting the anodes of said other diode of each of said pairs of diodes to each other and to the other of said input terminals of said relay circuit, and means connected between said input terminals of said relay circuit to prevent current from flowing through said relay circuit except when at least one of said output voltages of said power supplies varies from another of said output voltages by more than a predetermined amount.

9. Apparatus for monitoring the ratio of predetermined output voltages of at least three unidirectional power supplies each having a pair of output terminals and a pair of input terminals said apparatus comprising, in combination, a relay switch, means to connect a source of alternating current to each of said input terminals through said relay switch means connecting one terminal of each of said pairs of output terminals to a common connection, a voltage divider, means connecting successive taps of said voltage divider to the other terminal of each of said pairs of output terminals in a manner whereby there will be a series of points, each point being between successive taps, at a predetermined potential when said power supplies are operating normally, a pair of diodes associated with each of said points, means connecting each of said points with the anode of one of said diodes and the cathode of the other of said diodes of its associated pair of diodes, a relay circuit having a pair of input terminals and also including actuating means for said relay switch, means connecting the cathodes of said one diode in each of said pairs of diodes to each other and to one of said input terminals of said relay circuit, means connecting the anodes of said other diode of each of said pairs of diodes to each other and to the other of said input terminals of said relay circuit, and means connected between said input terminals of said relay circuit to permit current to flow through said relay circuit only when said output voltages of said power supplies vary from a predetermined ratio to thereby energize said actuating means.

References Cited in the file of this patent

UNITED STATES PATENTS

| | | |
|---|---|---|
| 1,888,718 | Friedlander | Nov. 22, 1932 |
| 1,980,395 | FitzGerald | Nov. 13, 1934 |
| 2,242,950 | Harder | May 20, 1941 |
| 2,381,527 | Traver | Aug. 7, 1945 |
| 2,399,322 | Carlin | Apr. 30, 1946 |
| 2,837,665 | Edwards | June 3, 1958 |
| 2,930,942 | Levine | Mar. 29, 1960 |
| 2,962,603 | Bright | Nov. 29, 1960 |